April 26, 1960 J. C. SLONCZEWSKI 2,934,747

MAGNETIC CORE

Filed Dec. 21, 1956

"ZERO"

"ONE"

"AUXILLIARY ONE"

INVENTOR.
JOHN C. SLONCZEWSKI

BY

Campbell, Brumbaugh, Free & Graves his ATTORNEYS.

United States Patent Office 2,934,747

Patented Apr. 26, 1960

2,934,747

MAGNETIC CORE

John C. Slonczewski, Wappingers Falls, N.Y., assignor to International Business Machines Corporation, New York, N.Y., a corporation of New York Application December 21, 1956, Serial No. 629,832

9 Claims. (Cl. 340—174)

The present invention generally relates to magnetic core memory devices and, more particularly, to a coincidence device for storing and transferring digital pulse information.

Binary digital information is represented in magnetic storage cores by their opposite states of remanence established and controlled by current pulses applied to windings positioned in inductive relation with the cores. Magnetic storage devices of the coincidence type provide that digital information will be controlled only by coincidently timed pulses applied to selected windings, the application of a single current pulse to any one winding being insufficient to control the stored binary digital information. It is a principal object of the present invention to provide an improved coincidence type magnetic storage device.

Another object of the invention is to provide a coincidence type magnetic storage device including a plurality of magnetic flux paths of substantially equal length.

A further object of the present invention is to provide a magnetic device of the above character for storing and transferring binary digital information in response to coincidently timed control pulses.

These and still further objects of the present invention are accomplished by providing a magnetic core member having high remanence, a strong well defined coercive force threshold and three separate magnetic flux paths of substantially equal length. Windings inductively related to the three magnetic flux paths are formed by a selected number of turns such that a current pulse in any one winding will be insufficient to switch the remanence state of either of the two flux paths with which the winding may be associated. However, when coincidently timed current pulses are applied to two selected windings the resulting magnetomotive force will be of sufficient magnitude to switch at least a portion of the core to its opposite remanence state. Sensing windings suitably mounted on the core provide pulses in response to coincident readout pulses.

Still further objects and advantages of the present invention will become apparent to those skilled in the art to which it pertains from the following detailed description of the present preferred embodiment thereof described with respect to the accompanying drawings, in which.

Figure 1:
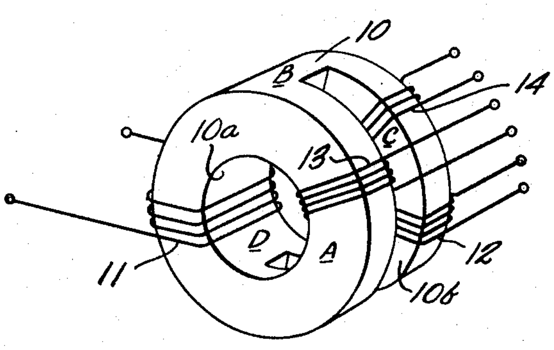
Figure 1 is a perspective view of a typical magnetic core member in accordance with the present invention having three magnetic flux paths of substantially equal length.

Referring to the drawings in greater detail, in Figure 1 a cylindrical core member 10 includes an axial bore 10*a* and a transverse slot 10*b* which form semicylindrical branches A and C of one thickness and another semicylindrical section branch BD of a second thickness somewhat greater than the thickness of the branches A and C. It will be apparent that the core member 10 is one representative structure that provides three separate magnetic flux paths ABDA, BCDB and ABCDA of substantially equal length.

A further requirement of the magnetic core member according to the invention relates to cross-sectional areas of the core branches. Thus, the cross-sectional areas of the branches A and C must be substantially equal. In addition, the cross-sectional area of the branch BD must be greater than or equal to the combined areas of the branches A and C since the flux paths ABDA and CBDC include the branch BD.

Windings 11, 12 and 13 are respectively carried by the branches BD, C and A, a sensing winding 14 also being disposed on the branch C.

Figure 2:
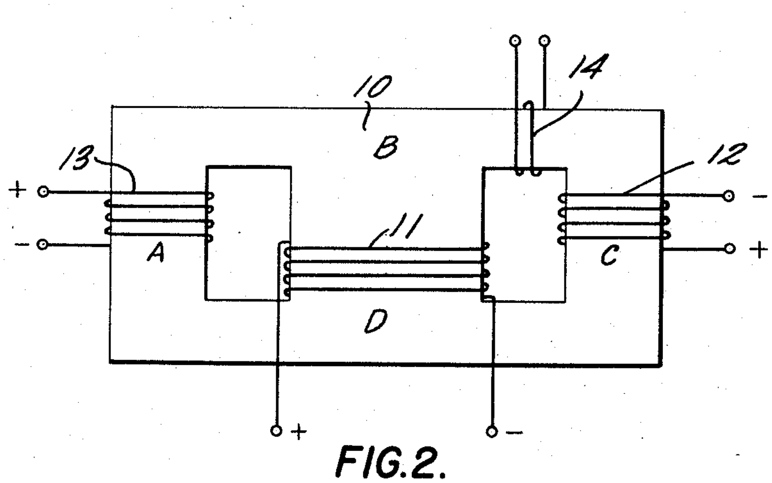
Figure 2 is a diagrammatic view of the magnetic core of Figure 1 illustrated in this manner solely for the purpose of aiding the description of the invention.

To facilitate a description of the invention, the core member 10 has been diagrammatically illustrated in Figure 2 from which it is evident that each of the three magnetic flux paths is linked by two of the windings 11, 12 and 13, the number of turns of each winding being such that a current pulse applied to any one winding will provide a magnetomotive force insufficient to reverse the remanence state of either of the two possible flux paths associated with it. Therefore, to switch the remanence state of any one of the magnetic flux paths, current pulses must be applied coincidentally to the two windings which link said path.

Figure 3:
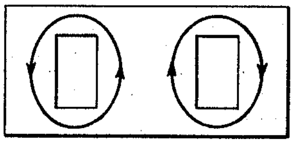
Figure 3 is an illustration of the magnetic flux lines to represent "zero;"
Figure 4:
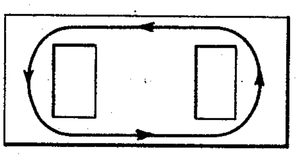
Figure 4 illustrates the magnetic flux lines to represent "one;"
Figure 5:
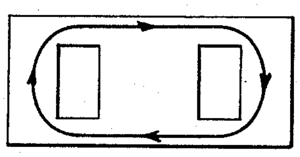
Figure 5 illustrates the reversal of the magnetic flux lines from the "one"direction to represent an "auxiliary one."

The orientation of the magnetic flux lines in the core 10 is shown in Figures 3, 4 and 5 to represent, arbitrarily, a "zero," "one" and "auxiliary one." If a "zero" is initially stored in the core 10, as shown in Figure 3, a "one" is written into the core by positive pulses coincidentally applied to the windings 11 and 12 to reverse the flux direction around the loop BCDB. The flux from the paths BCDB and BADB will then be in opposition in the section BD to substantially demagnetize it. In contrast, the flux produced by the pulses will be in the same direction along the path BADCB, as shown in Figure 4.

To return the core member 10 to "zero," negative pulses are coincidently applied to the windings 11 and 12 which provide sufficient magnetomotive force in the flux path BCDB to switch its remanence state. Accordingly, the core 10 is conditioned as shown in Figure 3.

To read stored information from the core member 10, the windings 12 and 13 are pulsed coincidentally by current pulses of opposite polarity, a positive pulse being applied to the winding 13 and a negative pulse to the winding 12. This may result in a flux polarity change from that indicated in Figure 4 to that indicated in Figure 5. Each of these pulses is then followed by a pulse of the opposite polarity in order to restore the flux polarity indicated in Figure 4.

More particularly, if the core 10 is magnetized in the "zero" state, as shown in Figure 3, a negative and a positive current pulse applied to the windings 12 and 13, respectively, will be insufficient to switch the remanence state of the respective flux paths due to the fact that these windings are in inductive relation with separate paths, no flux linking the branches A and C. Since two windings about the same flux path are required to provide a magnetomotive force great enough to alter a particular remanence state, no voltage will be induced in this instance in the sensing winding 14, which indicates that the core 10 is storing "zero."

On the other hand, if the core 10 is magnetized in a "one" state of magnetic remanence, as shown in Figure 4, the application of a negative and a positive current pulse coincidentally to the windings 12 and 13, respectively, will reverse the magnetic flux polarity from that shown in Figure 4 to that shown in Figure 5, because the windings 12 and 13 link the flux carrying path BADCB. This reversal of magnetic flux polarity will induce a voltage in the sensing winding 14, which voltage will be indicative of the "one" stored in the core 10. Then by the application of coincident current pulses of the opposite polarity to the same windings 12 and 13, the magnetic flux polarity previously established by reading out the "one," as shown in Figure 5, will be reversed to reestablish the "one" as shown in Figure 4. This illustrates the nondestructive read-out characteristics of the present invention. In other words, a "one" may be sensed in the sensing winding 14 as many times as read-out and reset pulses are applied to the windings 12 and 13.

It will be evident that the effect of the reading cycle is to induce a voltage signal in the sensing winding 14 in the event the core 10 is magnetized in the "one" state, but not if it is in the "zero" state. As previously described, by applying the read-out pulses to the windings 12 and 13, no voltage will be sensed by the winding 14 if the core is in the "zero" state. Therefore, if the core 10 was initially in the "zero" state, it will still be in the "zero" state after the read-out cycle is completed. Conversely, if the core was initially in the "one" state, due to the two-step cycle of the read-out pulses, the core 10 initially storing a "one" will maintain the "one" after the read-out cycle is completed.

The invention has been shown and described by way of example only, and many modifications and variations may be made therein by those skilled in the art to which it pertains without departing from the spirit and scope of the invention.

I claim:

1. In an information storage device, a magnetic core member formed of a material capable of assuming opposite stable states of magnetic remanence, said member including three branches forming three magnetic paths, each of said three magnetic paths being substantially equal in length, the first and second branches being substantially equal in cross-sectional area, the third branch having a cross-sectional area not less than the sum of the cross-sectional areas of the first and second branches, first, second and third winding means respectively mounted in inductive relation with said first, second and third branches, and a sensing winding means mounted in inductive relation with one of the first and second branches.

2. In an information storage device, a magnetic core member formed of a material capable of assuming opposite stable states of magnetic remanence, said member including three branches forming three magnetic paths, each of said three magnetic paths being substantially equal in length, first, second and third winding means respectively mounted in inductive relation with said first, second and third branches, and sensing winding means mounted in inductive relation with a predetermined one of said branches.

3. In an information storage device, a magnetic core member formed of a material capable of assuming opposite stable states of magnetic remanence, said member being formed with three magnetic paths substantially equal in length, a pair of winding means mounted in inductive relation with each of said magnetic paths, a predetermined number of turns forming each of said winding means so that the magnetic flux in said core member is switched from two of said magnetic paths to another of the paths in response to coincident current pulses in one pair of the winding means associated with one of the two magnetic paths to represent a binary quantity and the other path is switched also to its opposite remanence state in response to coincident current pulses in its associated pair of winding means when the core member represents said binary quantity, and sensing winding means mounted in inductive relation with said other path.

4. In an information storage device, a magnetic core member formed of a material capable of assuming opposite stable states of magnetic remanence, said member including three branches forming a first magnetic path including the first and second branches, a second magnetic path including the first and third branches and a third magnetic path including the second and third branches, said three magnetic paths being substantially equal in length, the first and second branches being substantially equal in cross-sectional area, the third branch having a cross-sectional area not less than the sum of the cross-sectional areas of the first and second branches, first, second and third winding means respectively mounted in inductive relation with said first, second and third branches, said second and third winding means being of such number of turns that only coincident current pulses therein are operable to switch the third magnetic path to its opposite remanence state, said first and second winding means being of such number of turns that only coincident current pulses therein are operable to switch the first magnetic path to its opposite remanence state, and sensing winding means mounted in inductive relation with one of the first and second branches.

5. In an information storage device, a magnetic core member formed of a material capable of assuming opposite stable states of magnetic remanence, said member including three branches forming a first magnetic path including the first and second branches, a second magnetic path including the first and third branches and a third magnetic path including the second and third branches, said three magnetic paths being substantially equal in length, the first and second branches being substantially equal in cross-sectional area, the third branch having a cross-sectional area not less than the sum of the cross-sectional areas of the first and second branches, first, second and third winding means respectively mounted in inductive relation with said first, second and third branches, said second and third winding means being of such number of turns that only coincident current pulses therein are operable to switch the third magnetic path to its opposite remanence state, said first and second winding means being of such number of turns that only coincident current pulses therein are operable to switch the first magnetic path to its opposite remanence state.

6. In an information storage device, a magnetic core member formed of a material capable of assuming opposite stable states of magnetic remanence, said member including three branches forming a first magnetic path including the first and second branches, a second magnetic path including the first and third branches, and a third magnetic path including the second and third branches, said three magnetic paths being substantially equal in length, first, second and third winding means respectively mounted in inductive relation with said first, second and third branches, said second and third winding means being of such number of turns that only coincident current pulses therein are operable to switch the third magnetic path to its opposite remanence state, said first and second winding means being of such number of turns that only coincident pulses therein are operable to switch the first magnetic path to its opposite remanence state, and sensing winding means mounted in inductive relation with one of said first and second paths.

7. In an information storage device, a magnetic core member formed of a material capable of assuming opposite stable states of magnetic remanence, said member including three branches forming three magnetic paths substantially equal in length, the first and second branches being substantially equal in cross-sectional area, the third branch having a cross-sectional area not less than the sum of the cross-sectional areas of the first and second branches, first and second winding means mounted in inductive relation with said second and third branches respectively, said first and second winding means being of such number of turns that only coincident current pulses therein are operable to switch the magnetic path formed by said second and third branches to its opposite remanence state.

8. In an information storage device, a magnetic core member formed of a material capable of assuming opposite stable states of magnetic remanence, said member including three branches forming three magnetic paths substantially equal in length, the first and second branches being substantially equal in cross-sectional area, the third branch having a cross-sectional area not less than the sum of the cross-sectional areas of the first and second branches, first and second winding means mounted in inductive relation with the first and second branches, said first and second winding means being of such number of turns that only coincident current pulses therein are operable to switch the magnetic path including said first and second branches to its opposite remanence state.

9. In an information storage device, a magnetic core member formed of a material capable of assuming opposite stable states of magnetic remanence, said member being formed with a plurality of magnetic paths substantially equal in length, a pair of winding means mounted in inductive relation with each of said magnetic paths, each of said winding means being of such number of turns that only coincident current pulses in one pair of the winding means are operable to switch the corresponding magnetic path of the member to its opposite remanence state, and sensing winding means mounted in inductive relation with a predetermined one of said magnetic paths.

References Cited in the file of this patent

UNITED STATES PATENTS

| | | |
|---|---|---|
| 2,685,653 | Orr et al. | Aug. 3, 1954 |
| 2,733,424 | Chen | Jan. 31, 1956 |
| 2,868,451 | Bauer | Jan. 13, 1959 |
| 2,869,112 | Hunter | Jan. 13, 1959 |

OTHER REFERENCES

Publication I, "The Transfluxor," by J. A. Rajchman and A. W. Lo, on pages 321–332 of vol. 44, issue 3 of Proceedings of the IRE, March 1956.